United States Patent
Kopinke et al.

(10) Patent No.: US 10,525,446 B2
(45) Date of Patent: Jan. 7, 2020

(54) METHOD FOR IN-SITU REGENERATION OF ACTIVATED CARBON LOADED WITH TRIHALOMETHANES USING ALKALINE HYDROLYSIS

(71) Applicant: OVIVO LUXEMBOURG S.A.R.L., Munsbach (LU)

(72) Inventors: Frank Dieter Kopinke, Leipzig (DE); Philippe Rychen, Muespach-le-Huat (FR)

(73) Assignee: Ovivo, Inc., Montreal (CA)

( * ) Notice: Subject to any disclaimer, the term of this patent is extended or adjusted under 35 U.S.C. 154(b) by 251 days.

(21) Appl. No.: 15/503,327

(22) PCT Filed: Aug. 11, 2015

(86) PCT No.: PCT/EP2015/068417
§ 371 (c)(1),
(2) Date: Feb. 10, 2017

(87) PCT Pub. No.: WO2016/023884
PCT Pub. Date: Feb. 18, 2016

(65) Prior Publication Data
US 2017/0232421 A1      Aug. 17, 2017

(30) Foreign Application Priority Data
Aug. 11, 2014   (DE) .......................... 10 2014 111 393

(51) Int. Cl.
*B01J 20/34* (2006.01)
*C02F 1/28* (2006.01)
(Continued)

(52) U.S. Cl.
CPC .......... *B01J 20/3416* (2013.01); *B01J 20/20* (2013.01); *B01J 20/3475* (2013.01); *C01B 32/36* (2017.08);
(Continued)

(58) Field of Classification Search
CPC .. C02F 1/283; C02F 2101/36; C02F 2103/04; C02F 2303/16; C01B 32/36; B01J 20/20; B01J 20/3416; B01J 20/3475
(Continued)

(56) References Cited

U.S. PATENT DOCUMENTS

| | | | | |
|---|---|---|---|---|
| 3,870,033 | A | * | 3/1975 | Faylor .................... B01D 61/08 165/163 |
| 4,187,195 | A | * | 2/1980 | Kennedy ............. B01J 20/3416 210/673 |
| 6,423,657 | B1 | * | 7/2002 | Wang ................... B01J 20/3416 502/25 |

FOREIGN PATENT DOCUMENTS

DE         4339887 A1 *  5/1995  .............. C02F 1/025

OTHER PUBLICATIONS

Centers for Disease Control and Prevention, Drinking Water Sources, Apr. 2009 [Retrieved on Jun. 10, 2019]. Retrieved from the Internet: <URL:https://www.cdc.gov/healthywater/drinking/public/water_sources.html>. (Year: 2009).*
(Continued)

*Primary Examiner* — Matthew O Savage
(74) *Attorney, Agent, or Firm* — Thomas M. Freiburger

(57) ABSTRACT

The invention pertains to a process for in-situ regeneration of activated carbon loaded with trihalomethane (THM). Based on the invention, this is achieved with alkaline hydrolysis of the THM with increased temperatures within the activated carbon in halogen-free, good water-soluble, or gaseous compounds. After completion of the chemical hydrolysis treatment, the activated carbon is cleared of reagents and reaction products by rinsing with water and diluted acids, and is then available for reloading in the untreated water flow. During the entire cleaning process, the activated carbon bed must not be moved.

12 Claims, 2 Drawing Sheets

Figure 1:
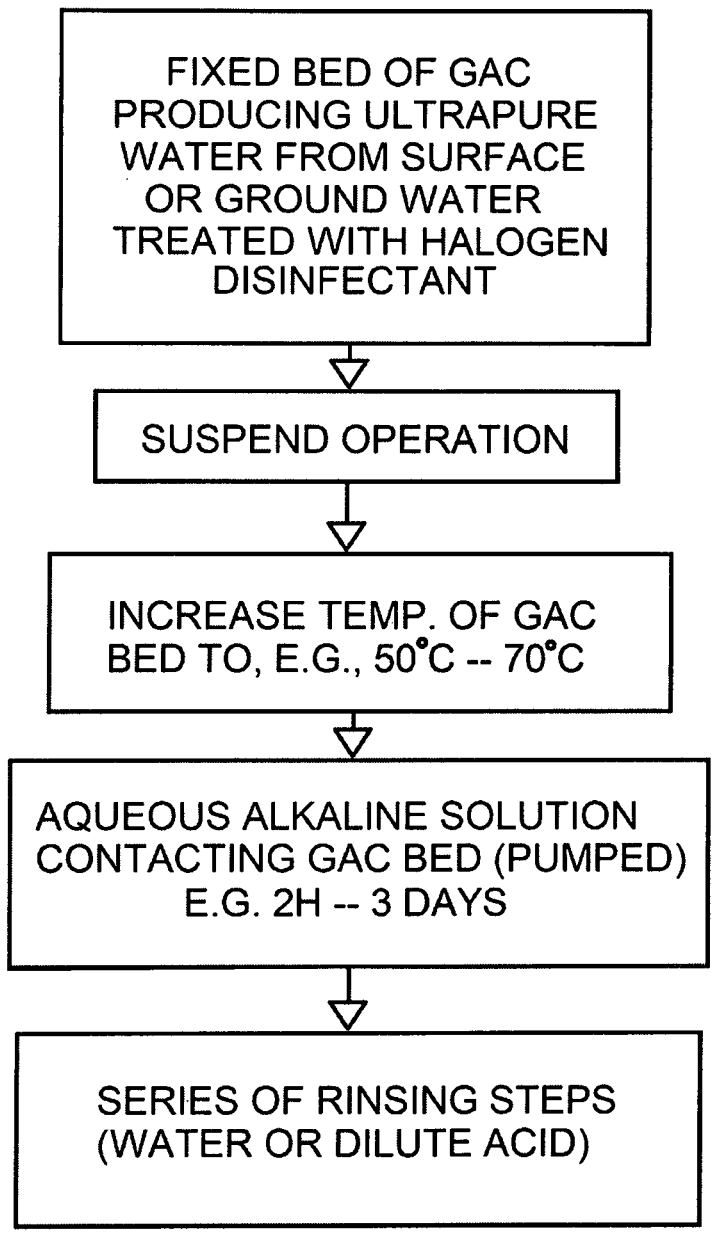

(51) Int. Cl.
  *B01J 20/20* (2006.01)
  *C01B 32/36* (2017.01)
  *C02F 103/04* (2006.01)
  *C02F 101/36* (2006.01)

(52) U.S. Cl.
  CPC .......... *C02F 1/283* (2013.01); *C02F 2101/36* (2013.01); *C02F 2103/04* (2013.01); *C02F 2303/16* (2013.01)

(58) Field of Classification Search
  USPC .......................................... 210/900; 502/22
  See application file for complete search history.

(56) References Cited

OTHER PUBLICATIONS

Potwora, Trihalomethane Removal With Activated Carbon, Jun. 2006 [Retrived on Jun. 10, 2019]. Retrived from the Internet: < www.wpconline.com/2006/06/27/trihalomethane-removal-activated-carbon/>. (Year: 2006).*

Mackenzie et al., "Catalytic effects of activated carbon on hydrolysis reactions of chlorinated organic compounds. Part 2: 1,1,2,2-tetrachloroethane", Applied Catalysis B: Environmental, 2005, 59, 171-179.

Mackenzie et al., "Catalytic effects of activated carbon on hydrolysis reactions of chlorinated organic compounds. Part 2. 1,1,2,2-Tetrachloroethane", Applied Catalysis B: Environmental 59, 2005, 171-179.

* cited by examiner

METHOD FOR IN-SITU REGENERATION OF ACTIVATED CARBON LOADED WITH TRIHALOMETHANES USING ALKALINE HYDROLYSIS

The invention pertains to a process for in-situ regeneration of activated carbon loaded with trihalomethane (THM). Based on the invention, this is achieved with alkaline hydrolysis of the THM at increased temperatures within the activated carbon in halogen-free, good water-soluble, or gaseous compounds. After completion of the chemical hydrolysis treatment, the activated carbon is cleared of reagents and reaction products by rinsing with water and diluted acids, and is then available for reloading in the untreated water flow. During the entire cleaning process, the activated carbon bed must not be moved. The invention pertains further to the use of the process in accordance with the invention to obtain ultrapure water for use in the semiconductor industry, in particular in the manufacture of semiconductors.

THM results from the chlorination of water from various sources, including natural surface and ground water, recycled bath water, etc., for the purpose of sanitization (germ elimination). It is formed by the so-called halo form reaction from dissolved organic compounds. The main component of the THM fraction is chloroform ($CHCl_3$). THM has carcinogenic properties and for most intended uses of treated water it needs to be removed to very low residual concentrations (<10 µg/l). Due to the global spread of chlorine as a treatment step for untreated water, the efficient removal of the accumulated THM is a globally relevant problem. The amount of water contaminated as the result of this process is on the magnitude of >$10^{10}$ m³ annually.

Based on the state-of-the-art, the contaminated water is treated primarily by adsorption on activated carbon. Generally the adsorption is done with granulated activated carbon (GAC) in a fixed bed arrangement. Once it is saturated, the GAC must be replaced and regenerated. The ex-situ regeneration, for example with thermochemical methods or with steam stripping, is state-of-the-art; however it is associated with significant costs and process-related expenses. The GAC fixed bed must be removed from the filter holder and transferred to special regeneration equipment, usually at the activated carbon manufacturer's site. As a result, there are additional transportation costs as well as GAC loss from wear, etc.

For the reasons stated, an in-situ regeneration without mechanical movement of the GAC fixed bed would be beneficial. The technical literature describes numerous methods for in-situ treatment of GAC. The majority of them are based on chemical oxidation of the adsorbed contaminants, e.g., with solutions containing hydrogen peroxide. A newer paper describes the regeneration of GAC loaded with chloroform (0.04 Ma-%) (Ma-%=percent by weight, e.g., g chloroform per 100 g activated carbon) by oxidation with persulphate (Huling et al., Persulfate oxidation of MTBE- and chloroform-spent granular activated carbon. *J. Hazard. Mat.* 2011, 192, 1484-1490). The reaction conditions to be applied are harsh (3 d at 55° C. and 500 g persulphate per kg GAC), and the results achieved are unsatisfactory (only 20-60% chloroform removal). In the opinion of chemists, this is not surprising because chloroform is notorious for being counted among compounds that are difficult to oxidize.

An alternative to oxidation of chlorinated compounds (CHC) is hydrolysis in aqueous media. EP 1 406 840 describes a multi-stage process for decontamination of waters that are loaded with organic halogen compounds. In it, the first step is to subject the CHC (chlorinated hydrocarbons) to partial dechlorination in the water phase and then remove the resulting reaction products in a second step by stripping them out. The partial dechlorination can be done by various methods, including with alkaline hydrolysis in a homogeneous aqueous solution. In a different embodiment, DE 102 23 112 A1 describes the hydrolysis of CHC as a first step in a chain of treatment steps. In so doing, highly volatile CHC is converted by partial dechlorination into less volatile CHC which is then removed by stripping from the water phase. An example of this is the conversion of 1,1,2,2=tetrachloroethane into trichloroethylene and the conversion of hexachlorocyclohexane into trichlorobenzene (Mackenzie et al. Catalytic effects of activated carbon on hydrolysis reactions of chlorinated organic compounds. Part 1: γ-Hexachlorocyclohexane. *Cat. Today* 2005, 102-103C, 148-153 and Part 2: 1,1,2,2-tetrachloroethane. *Appl. Cat. B Environm.* 2005, 59, 171-179.). In the course of this it was discovered that the tested CHC hydrolyzed faster in activated carbon than with the same pH value in a homogeneous aqueous solution.

The three examples listed have three characteristics in common:

a) Despite the use in some instances of drastic reaction conditions, only partial dechlorination was achieved with hydrolysis. Chlorine-containing and similarly toxic reaction products resulted, and their removal from the water phase required at least one additional process step.

b) Stripping out the newly formed CHC is an inherent part of the process chain. The activated carbon used is not regenerated, but instead used only as reactor charge.

c) The treated activated carbon was always loaded with a high content of CHC (1 to 20 percent by weight). Nothing was predicted about the accessibility and reactivity of very low residual loads, as they are eliminated in the process according to the invention described here.

Chloroform is not described in any of the cited examples as a substrate. Initially, the hydrolysis of chloroform as sorbate in commercial GAC was examined in a separate preliminary study (see Example 1). In so doing it was found that no significant degree of removal could be achieved for chloroform in the reaction conditions described in the literature (pH=12 to 14, ambient temperature, reaction times up to 1 week).

From the point of view of the chemist, all examples listed for the hydrolysis of CHC follow a standardized reaction mechanism—the β elimination of hydrogen chloride (HCl) from a CHC molecule. This reaction can only take place when the CHC molecule exhibits at least one Cl atom and one H atom on the adjacent C atoms in trans position. Because chloroform only contains one C atom, this prerequisite is not met and the molecule must be considered difficult to hydrolyze. What's more, there seems to be very efficient protection of the chloroform against hydrolytic removal in the sorbed condition. All these are unfavorable prerequisites for regenerating activated carbon with a low load by means of this reaction type.

The flushing of reaction products and reagents is a necessary prerequisite for regenerating a GAC filter, along with a suitable chemical conversion of the THM into harmless products. Depending on the type of water treatment, e.g., to create drinking water or ultra pure water for chemical processes, the requirements for the quality of the GAC eluate based on its regeneration are very high and expressed by parameters like pH value or salt content. At the same time, the quantity of water used for this rinse and now to be disposed of will be limited. These two requirements are an area of tension. In addition are the known properties of GAC which delay the material transport with slow intraparticle diffusion and buffer capacities. Chemical regeneration and flushing result in unavailability of the filter system for regular operation. This time frame needs to be minimized.

Overall, optimizing the flushing process presents a considerable economic and technical challenge for the entire in-situ regeneration process. Only when it is possible to achieve both steps—the chemical elimination of contaminants and the flushing of the GAC fixed bed—with acceptable time and material expense, then in-situ regeneration can compete successfully on economic terms with state-of-the-art off-site regeneration.

The process described below must then carry out three tasks:
a) the chemical conversion of THM, in particular chloroform, into toxicologically harmless products which are as halogen-free as possible and which are only slightly retarded by the GAC.
b) the flushing of regenerated GAC to remove all reaction products and reagents with the lowest possible water consumption, completed in an appropriate time period, and
c) the chemicals and reagents used should be as cost-effective and environmentally friendly as possible.

Figure 2:
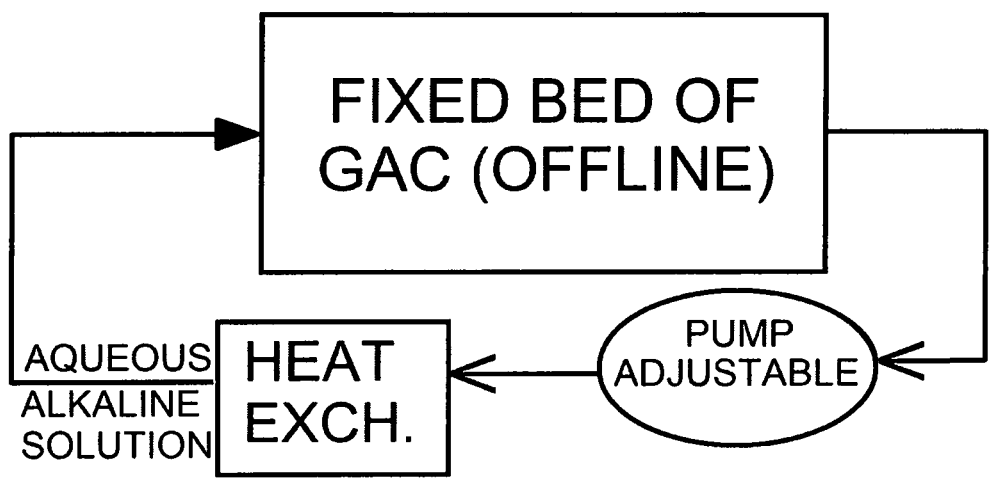

FIG. 1 illustrates a flowchart of the inventive process.
FIG. 2 illustrates a diagram of an alkaline circuit for regenerating a fixed bed of GAC.

For the process based on the invention involving heterogeneous hydrolysis of the THM in the alkaline environment with increased temperatures directly in the adsorbed condition and a multi-stage washing process for the GAC bed. In accordance with the general gross reaction equation

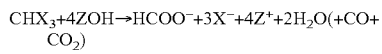
$$CHX_3 + 4ZOH \rightarrow HCOO^- + 3X^- + 4Z^+ + 2H_2O(+CO+CO_2)$$

wherein X=Cl, Br, Fl or I and Z=Na or K,
or as a specific example with chloroform and sodium hydroxide

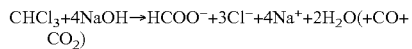
$$CHCl_3 + 4NaOH \rightarrow HCOO^- + 3Cl^- + 4Na^+ + 2H_2O(+CO+CO_2)$$

and in the general form

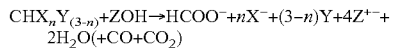
$$CHX_nY_{(3-n)} + ZOH \rightarrow HCOO^- + nX^- + (3-n)Y^- + 4Z^+ + 2H_2O(+CO+CO_2)$$

wherein X and Y=Cl, Br, Fl or I, Z=Na or K and n=1 or 2,
or as a specific example with dibromochloromethane and sodium hydroxide

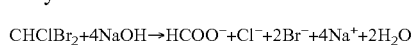
$$CHClBr_2 + 4NaOH \rightarrow HCOO^- + Cl^- + 2Br^- + 4Na^+ + 2H_2O(+CO+CO_2),$$

the reaction products are formic acid, carbon monoxide (in small quantities), and in the specific examples with chloride and bromide which are not significantly adsorbed on activated carbon and can be removed entirely with flushing. Sodium hydroxide is converted into sodium chloride or sodium bromide in the specific examples. Only cost-effective, non-water-polluting chemicals are used. No additional treatment steps are required, such as stripping out reaction products.

Based on the invention, this involves a process for in-situ regeneration of activated carbon loaded with trihalomethanes, thereby characterized in that the loaded activated carbon in an inactive fixed bed with increased temperature is put in contact with an aqueous alkaline solution and rinsed with a sequence of rinsing steps with water and/or dilute acids. A flowchart of the process is shown in FIG. 1.

With the trihalomethanes, it preferably involves chloroform, fluoroform, bromoform, iodoform, bromodichloromethane, or dibromochloromethane; chloroform is preferred in particular.

The aqueous alkaline solution shows a preferred pH value of 13 to 14.

The preferred alkaline solution is sodium hydroxide or potassium hydroxide with a concentration of 0.1 to 10 molar; use of 0.5 to 2 molar is recommended.

The preferred reaction temperature in the inactive fixed bed is in the range of 40 to 80° C.; 50 to 70° C. is preferred in particular.

The preferred length of treatment for the fixed bet with the alkaline solution is in the range of 2 hours to 3 days; 12 to 26 hours is recommended. In so doing, the length of treatment can be optimized based on the parameters of alkaline concentration, reaction temperature, and required degree of THM removal.

The preferred method is for the alkaline solution to be pumped in circulation in an alkaline circuit through the fixed bed with a heat exchanger integrated in the alkaline solution flow to heat and cool the fixed bed as shown in FIG. 2. The pump can be an adjustable pump having a variable rate.

It is recommended that the fixed bed be rinsed after the end of the alkaline solution treatment with a sequence of rinsing steps with water and/or diluted acids.

Following the end of the alkaline solution treatment, it is recommended that the fixed bed be next rinsed with one or more bed volumes of water. The alkaline solution of higher concentration involved here is saved for later treatment steps and the fixed bed is rinsed with a sequence of rinsing steps using diluted acids and/or water.

The preferred rinsing method consists of a sequence of one to five rinsing steps, preferably only one rinsing step each with one or more bed volumes of diluted acids, preferably 0.05 to 0.5 molar hydrochloric acid or sulphuric acid followed by an additional 5 to 100 rinsing steps, with 10 to 30 recommended, each with one or more bed volumes of pure water.

It is recommended that the rinsing steps maintain a contact time between the rinsing medium and the fixed bed of 10 minutes to 2 hours per step, with 15 to 30 minutes preferred. In so doing, the contact time can be adjusted based on variations in the pump rate or by setting a resting phase between the pump phases.

The process based on the invention for in-situ regeneration of activated carbon loaded with trihalomethanes is used in an embodiment for manufacturing ultrapure water. For ultrapure water, this involves water that contains almost zero impurities. Per the definition of highly purified water (Aqua valde purificata), as used in the pharmaceutical industry in particular, the following requirements are imposed on this water:
conductivity≤1.1 µS/cm at 20° C.
bacterial endotoxins<0.25 IE/ml (corresponds to about 25 ng/l)
total organic carbon (TOC)≤0.5 mg/l
nitrate≤0.2 mg/l.

The ultrapure water created by the process based on the invention is used in the semiconductor industry, in particular in the manufacture of semiconductors.

In the semiconductor industry, the ultrapure water must satisfy very strict requirements. Here the conductivity is defined at <0.055 µS/cm, or <18.2 MOhm/cm specific resistance.

Although chloroform is difficult to hydrolyze and is completely sorbed in the pores of the GAC, it can be hydrolyzed by using drastic reaction conditions. Lab experiments in the presence of and in the absence of activated carbon have surprisingly shown that the heterogeneous hydrolysis of chloroform takes longer than homogeneous reaction by two to three orders of magnitude. This finding is contrary to the catalytic effects described in DE 102 23 112 A1 in which activated carbon accelerated the hydrolysis of certain CHC. However, in order to achieve the high degree of conversion for chloroform, three process parameters can be varied: the pH value of the regeneration solution, the temperature, and the reaction time. The examples listed describe several optimized parameter combinations.

It is important to note the finding that significantly increased reaction temperatures of ≤80° C., with ≤70° C. preferred, are sufficient for almost complete hydrolysis of the chloroform within 36 hours. These temperatures are easy to adjust in conventional GAC filter units and can be generated with the use of cost-effective waste heat.

Adherence to the structure, the inner surface, and the sorption properties of the GAC are essential to the success of the process based on the invention, regardless of the drastic reaction conditions to be used (see Example 5).

Experiments at lab scale show that with optimized reaction conditions alone, extremely low THM loads in the range of 0.01 percent by weight can be eliminated (see Example 2). This surprising ability is important to the extent that the THM concentrations in the water to be purified can be very low, for example in the range of fewer µg/l which results in an extremely low activated carbon load. The order of magnitude for the loads to be expected is derived with the assumption of a chloroform intake concentration of 50 µg/l, from the following rough estimate: $q_{AK}=K_2 \times C_{chloroform\ in\ water}=10^4\ l/kg \times 50\ \mu g/l=10^{-4}\ kg/kg=0.05\%$, with $K_d$ as the coefficient of sorption of chloroform from water onto activated carbon.

The regeneration based on the invention is also not impaired by co-adsorbates, like macromolecular organic compounds (humic substances), as they are typically contained in untreated water and likewise adsorbed by activated carbon filters (see Example 3).

This excellent ability of the hydrolytic treatment based on the invention to destroy even the smallest contaminants entirely is the result of several factors:
 a) a large surplus of cost-effective hydrolitic agents (e.g., sodium hydroxide)
 b) the accessibility of the sorbed contaminants for "small" hydroxide ions even from preferred sorption plates in the micropores and nanopores of the activated carbon,
 c) the failure of a competitive reaction that can parasitically consume the regenerating agent (such as the activated carbon itself in the oxidation process) and
 d) the robustness of the actual chemical conversion. The hydrolytic reaction does not require a catalyst which could be contaminated by other substances in the water or co-adsorbate.

The flushing of the GAC bed after the conclusion of the chemical hydrolytic treatment is carried out with an optimized sequence of rinsing steps. In so doing, both the draining of the sodium hydroxide from the GAC fixed bed from underneath as well as a displacement of the sodium hydroxide by using fresh water (in both directions) can be used without the filter bed becoming dry.

The still highly concentrated sodium hydroxide from the first rinse step, possibly also from the first rinse steps, can easily be used for additional hydrolyzed treatments. If needed, the desired pH value for the recycled sodium hydroxide is adjusted before it is re-used by mixing in fresh, highly concentrated sodium hydroxide (e.g. 40%) or fixed sodium hydroxide in flake form.

The washing process can now progress continually, in steps, or semi-continuously by periodically pumping the rinse water in a circuit. It is important that a contact time of at least 10 minutes to 2 hours be maintained for the wash water; the preference is for 30 minutes in continuous operation or an equilibrium time between rinse water (rinsing medium) and fixed bed (fixed material) in step-by-step operation of at least 10 to 30 minutes (depending on the GAC particle size and the distribution of pore size). Faster rinsing reduces the efficiency, meaning the water consumption is increased for the same rinsing result.

The result of the rinsing can be tracked with the pH value of the eluate or its electrical conductivity. Rinsing experiments on GAC columns at lab scale have shown that the efficiency of the flushing is initially high, meaning the progress tracks the calculated volume of rinse water and the volume of the pores approximately; however it decreases more and more as rinsing progresses.

This non-beneficial progress can be significantly improved when fresh water in the eluate is replaced with a diluted acid, such as hydrochloric acid (HCl), started at a certain pH value. In so doing, the slowly rinsed out alkalinity (=buffer capacity) stored in the activated carbon is neutralized. The salts formed by the neutralization (e.g. NaCl) are more easily rinsed out than the stored sodium hydroxide. In the process, a temporary "hyperacidity" of the eluate can occur and be easily handled (see Example 7). In this manner, discharge values (pH value approx. 8, conductivity<0.1 mS/cm) can be achieved with 20 to 30 bed volumes which easily allows re-use of the regenerated GAC filter.

DESIGN EXAMPLES

The examples are based on experiments at lab scale. In the process, a commercial GAC (particle fraction: 1 to 3 mm, specific surfaces based on the BET method: 1150 m²/g) from aqueous solution was loaded with approx. 0.05 percent by weight chloroform (or bromoform) and equilibrated for at least one week. Afterward 10 g of aliquot from the activated carbon were filled in thermostated columns and subjected to various treatments. Water samples were taken based on the specified treatment times and their chloride content determined. At the end of the treatment period the GAC columns were either
 a) rigorously extracted with toluene as an extracting agent and the extract analyzed for existing CHC using gas chromatography, or
 b) the columns were flushed with a sequence of rinsing steps. In so doing, the pH value and the electrical conductivity of the column eluate were measured.

Example 1

One of the GAC columns prepared as described above was filled with 20 ml 1 M sodium hydroxide (pH=14) and loaded at ambient temperature (20±2° C.) for seven days. Afterwards the sodium hydroxide was removed and its chloride content determined. The amount was 1.5 mg/l. This value corresponds with a chloroform conversion rate of approx. 0.7%. The example shows that chloroform sorbed in GAC is hydrolyzed extremely slowly at ambient temperature.

Example 2

Five GAC columns loaded with chloroform were subjected to the following treatment conditions in parallel trials (see Table 1):

TABLE 1

| | t [hr] | pH value | T [° C.] | Chloroform conversion [%] from chloride balance |
|---|---|---|---|---|
| Column 1 | 72 | 14 | 50 | 42 |
| Column 2 | 48 | 14.3 | 60 | 91 |
| Column 3 | 36 | 14.3 | 70 | 99 |
| Column 4 [1)] | 16 | 13.7 | 80 | 82 |
| Column 5 [2)] | 24 | 14 | 70 | 83 |

[1)] KOH instead of NaOH
[2)] Initial loading of GAC 0.01 instead of 0.05 weight by percentage Under suitable reaction conditions within 1 to 2 days of treatment time, a high rate of chloroform conversion could be achieved (>90%).

For confirmation of the chloroform conversions calculated from the chloride balance, the GAC charge from Column 3 was subjected to rigorous solvent extraction. The gas chromatography analysis of the extract showed a residual chloroform content in the GAC of approx. 2 µg/g which corresponds with a rate of elimination of 99.6%. This value also confirms that the hydrolysis of the chloroform results in complete chloride release and no chlorinated byproducts are formed.

The data from Column 5 show that very low loads can also be eliminated with the process.

Example 3

In loading the GAC with 0.05 percent by weight chloroform, a commercial humic acid (from the Aldrich company) was also added with a concentration of 5 mg/l. This is used as a substitute for natural organic material (NOM) in untreated water. About half of this humic acid was adsorbed by the GAC at the same time as the chloroform and provided an additional load of approx. 0.5 percent by weight. This additional load was 10 times higher than the chloroform load. One of the columns filled with this co-loaded GAC was subject to hydrolysis similar to Example 2, Column 3. >97% chloride yield was measured in the sodium hydroxide, and 4 µg of unconverted chloroform per g of GAC was measured in the toluene extract, which corresponds with a chloroform residual of 0.8%.

The example shows that even higher loads with co-sorbates like humic compounds do not decisively inhibit the hydrolysis of chloroform in the GAC.

Example 4

The GAC was loaded with 0.1 percent by weight bromoform ($CHBr_3$) instead of chloroform and subjected to hydrolysis in accordance with Example 2, Column 3. The bromide determination in the sodium hydroxide indicated a recovery of >95%. The solvent extraction resulted in no unconverted bromoform whatsoever in the extract.

Example 5

GAC was characterized before and after hydrolytic treatment per Example 2, Column 3 by measuring the inner surfaces with the BET method and by microscopic measurement of the average particle size. The BET surfaces remained unchanged within the method's measurement accuracy (±10%) at 1000 to 1200 $m^2/g$. Particle size distribution and mechanical stability (abrasion resistance) also showed no significant changes. The chloroform adsorption of both GAC samples was likewise the same (coefficient of sorption $K_d \approx 2 \times 10^4$ l/kg with $C_{Chloroform} \approx 50$ µg/l).

Example 6

A GAC column equilibrated in accordance with Example 1 with 1 M of sodium hydroxide was washed with a total of 50 bed volumes of deionized water (demineralized water) in intervals. In the process, the equilibrium time between two wash steps for every bed volume was 15 minutes. The last discharge water from the flushing showed a pH value of 11.2 and a conductivity of 350 µS/cm. This value corresponds with a NaOH residual concentration of 1.6 mM or an enrichment of the output concentration by a factor of 625. In the case of an "ideal" not-retarded wash of the GAC columns (with adverse complete backmixing) a enrichment factor of $2^{50} \approx 10^{15}$ is calculated. The practically much less efficient flushing is essentially attributed to the acid-base buffer properties in the activated carbon.

The example shows that the neutral rinsing of a previously alkaline equilibrated GAC fixed bed with pure water is only attainable with great effort.

Example 7

It was carried out analgous to Example 6, however with the difference that after two bed volumes of pure rinse water, it was washed with two additional bed volumes of 0.05M hydrochloric acid. The first eluate after the second column rinsing shows a pH value of 3. Afterwards it was washed at 15 minute intervals with an additional 29 bed volumes of demineralized water. The last discharge water from the flushing showed a pH value of 6.0±0.3 and a conductivity of 110 µS/cm. These values correspond to a neutral eluate with a NaCl residual concentration of approx. 0.9 mM. The reduction factor in the conductivity of the last eluate compared with the initial condition (1M NaOH) is calculated at about 2000. This result was achieved with 34 bed volumes of rinse water compared with 50 bed volumes in Example 6.

This example shows that an acid rinse in the flushing process can significantly improve the outcome. The wash process is always delayed by the buffer properties of the activated carbon; however the retarding of the NaCl is clearly less pronounced that that of the NaOH.

The invention claimed is:

1. Process for in-situ regeneration of activated carbon in a fixed bed loaded with trihalomethanes, characterized in that the loaded activated carbon in the fixed bed when inactive, at an increased temperature, is brought into contact with a flow of aqueous alkaline solution and rinsed with a sequence of rinsing steps with water and/or diluted acids, and wherein the alkaline solution flow is circulated in an alkaline circuit through the fixed bed by pumping and a heat exchanger for heating and cooling the fixed bed is integrated into the alkaline solution flow.

2. Process based on claim 1, characterized in that the trihalomethanes involve chloroform, fluoroform, bromoform, iodoform, bromodichoromethane, or dibromochloromethane.

3. Process based on claim 1, characterized in that sodium hydroxide or potassium hydroxide with a concentration of 0.1 to 10 molar is used as the alkaline solution.

4. Process based on claim 1, characterized in that a treatment duration of the fixed bed with alkaline solution is in the range of 2 hours to 3 days.

5. Process based on claim 4, characterized in that the treatment duration of the fixed bed with alkaline solution is in the range of 12 to 26 hours.

6. Process based on claim 1, characterized in that the sequence of rinsing steps consists of one to five rinsing steps each with one or more bed volumes of diluted acids at 0.05 to 0.5 molar hydrochloric acid or sulphuric acid, followed by an additional 5 to 100 rinsing steps each with one or more bed volumes of pure water.

7. Process based on claim 6, characterized in that the rinsing steps maintain a rinsing contact time with the fixed bed of 10 minutes to 2 hours each, wherein the contact time is adjusted by varying pump rate or by setting a rest phase between pump phases.

8. Process based on claim 7, characterized in that said contact time between the rinsing medium and the fixed material is in the range of 15 to 30 minutes.

9. Process based on claim 6, wherein the additional rinsing steps are in the range of 1.0 to 30.

10. Process based on claim 1, characterized in that sodium hydroxide or potassium hydroxide with a concentration of 0.5 to 2 molar, is used as the alkaline solution.

11. Process based on claim 1, wherein said increased temperature is a range of about 50° to 70° C.

12. Process based on claim 1, wherein said increased alkaline solution has a pH of 13 to 14.

\* \* \* \* \*

UNITED STATES PATENT AND TRADEMARK OFFICE
CERTIFICATE OF CORRECTION

| | |
|---|---|
| PATENT NO. | : 10,525,446 B2 |
| APPLICATION NO. | : 15/503327 |
| DATED | : January 7, 2020 |
| INVENTOR(S) | : Frank Dieter Kopinke and Philippe Rychen |

It is certified that error appears in the above-identified patent and that said Letters Patent is hereby corrected as shown below:

In the Claims

In Claim 9, Column 9, Line 22: after the word "of", delete "1.0" and replace with "10".

In Claim 12, Column 9, Line 28: after "said", delete "increased" and replace with "aqueous".

Signed and Sealed this
Third Day of November, 2020

Andrei Iancu
*Director of the United States Patent and Trademark Office*